Dec. 7, 1926.  
J. K. WHITE  
1,610,115  
SCREEN ATTACHMENT FOR AUTOMOBILES  
Filed June 4, 1925   3 Sheets-Sheet 1
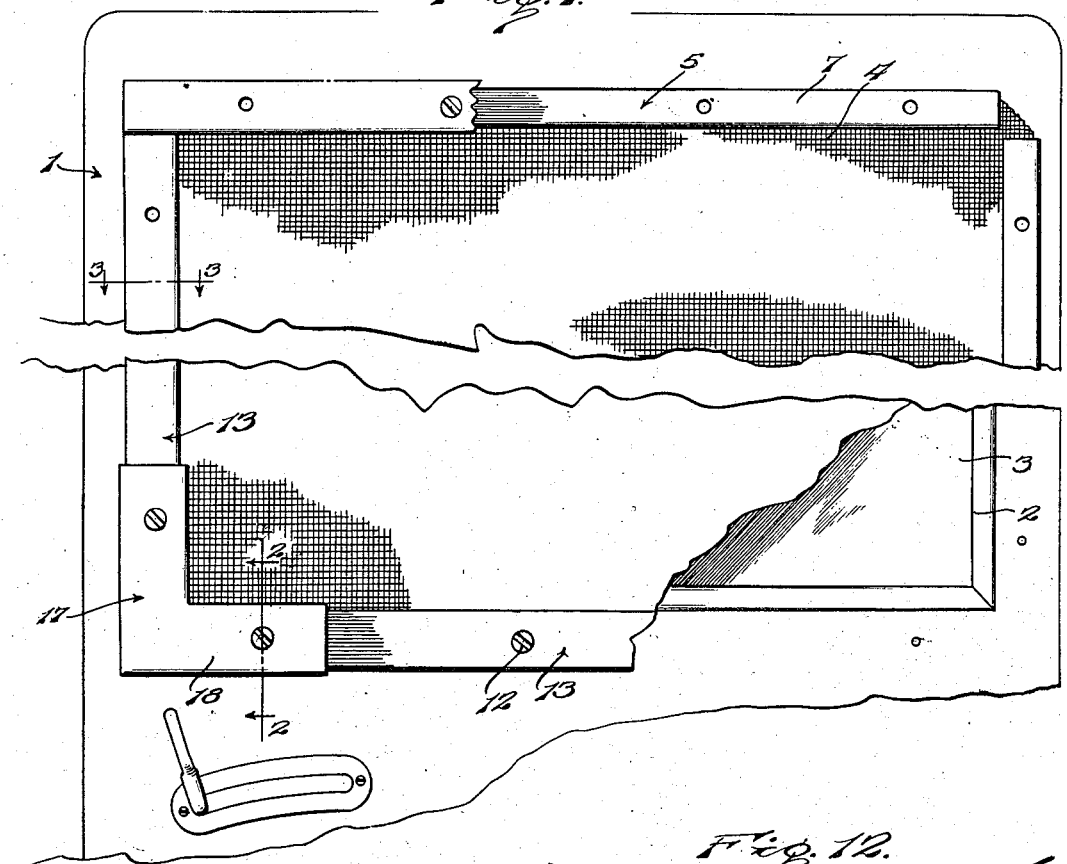
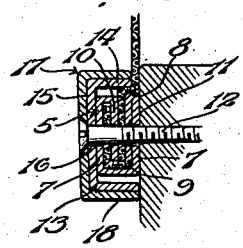
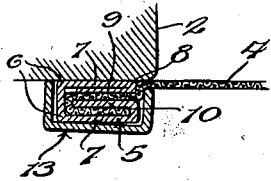
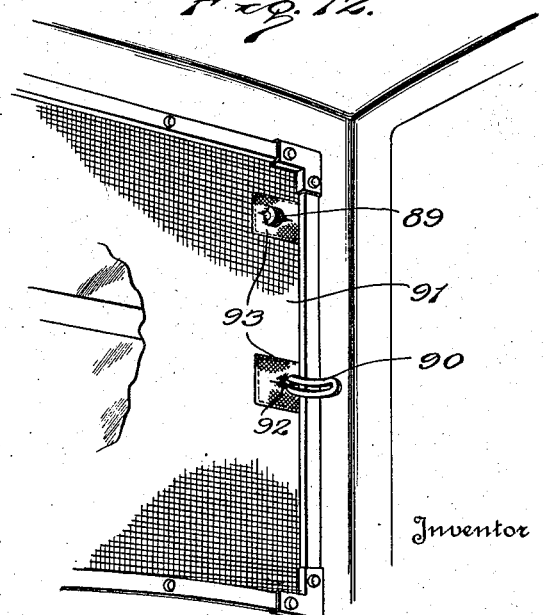
Inventor  
J. K. White Dec. 7, 1926.  
J. K. WHITE  
1,610,115  
SCREEN ATTACHMENT FOR AUTOMOBILES  
Filed June 4, 1925  
3 Sheets-Sheet 2
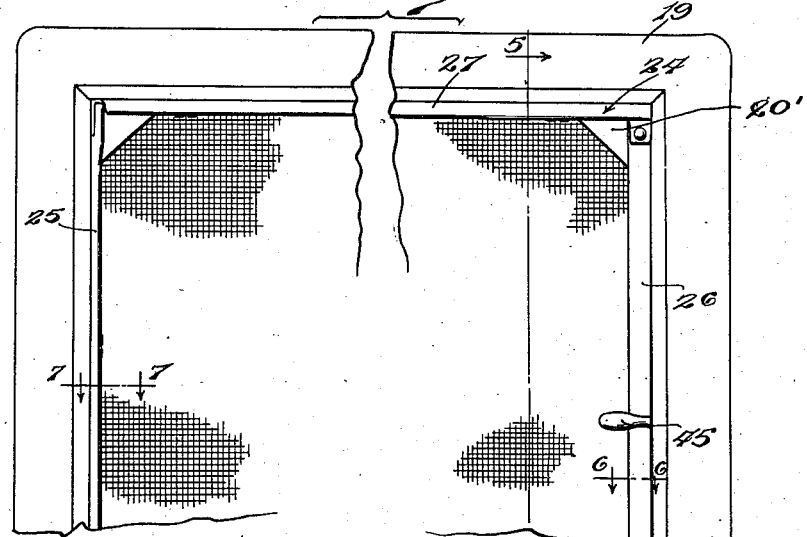
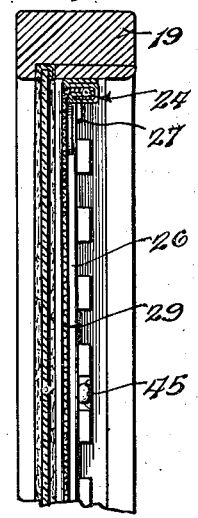
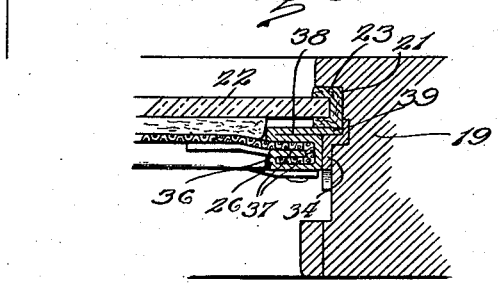
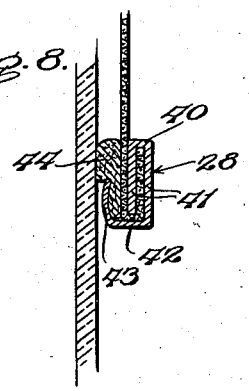
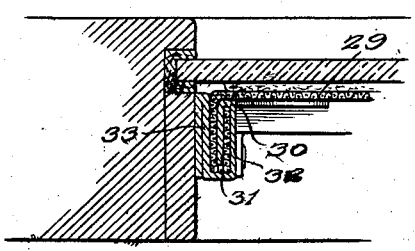
Inventor  
J. K. White  
By *Lacey & Lacey*, Attorneys

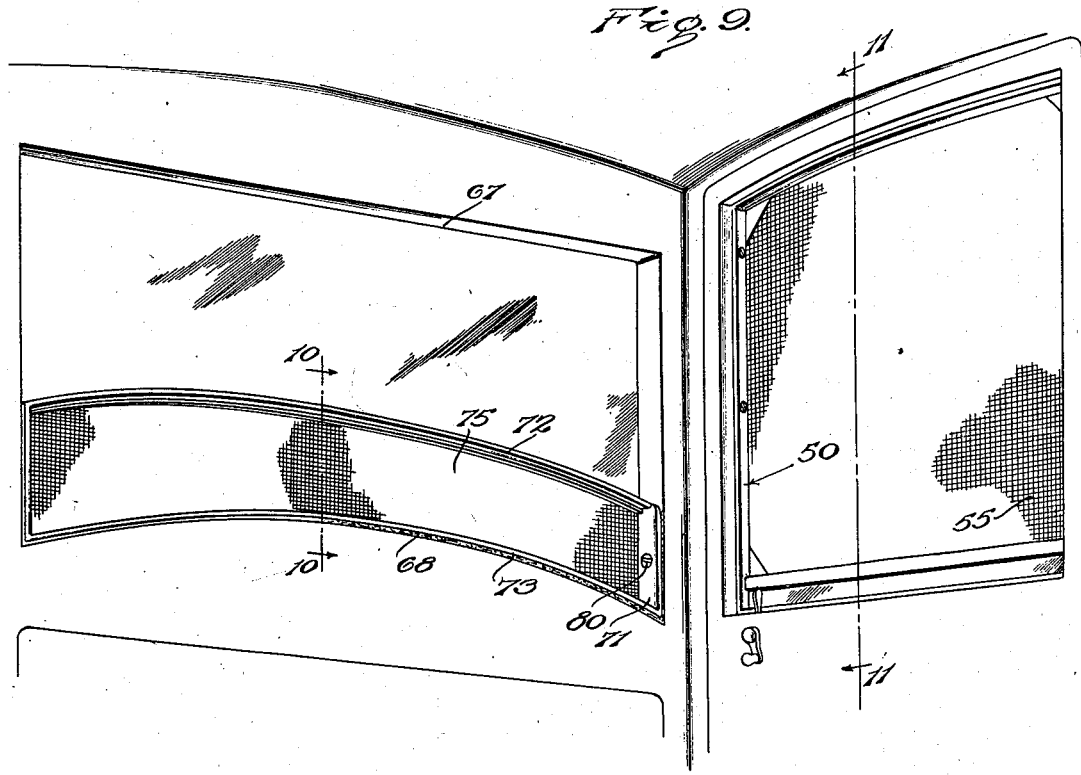
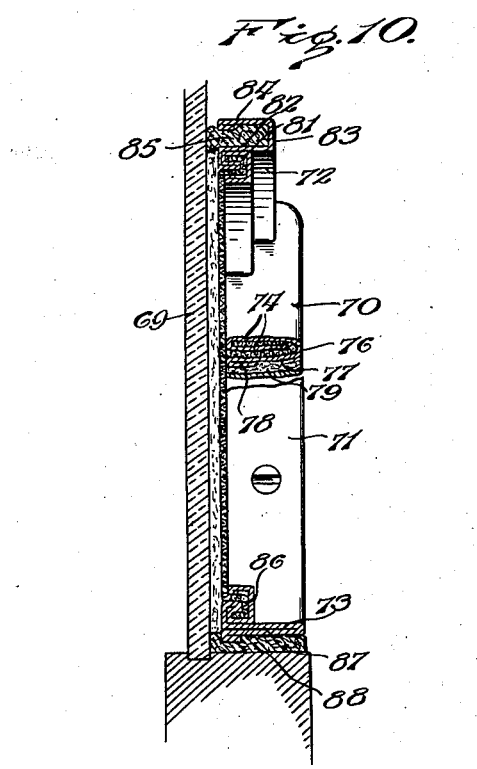
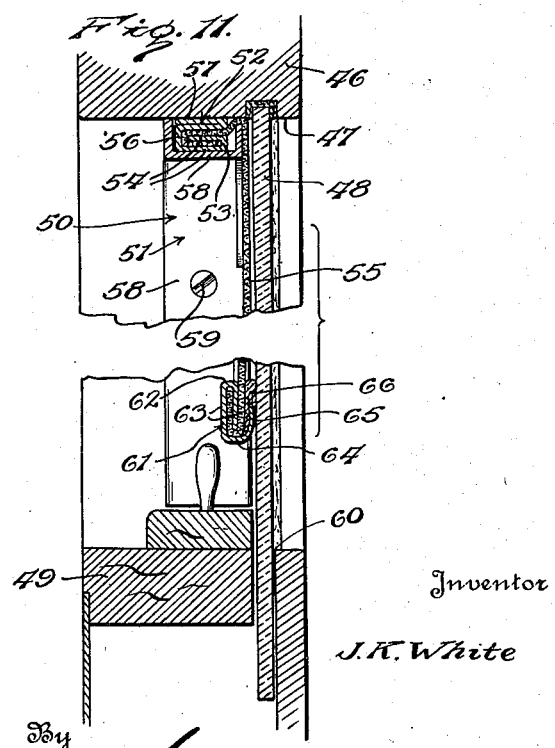

Patented Dec. 7, 1926.

1,610,115

UNITED STATES PATENT OFFICE.

JOEL KIRK WHITE, OF LA CROSSE, WISCONSIN.

SCREEN ATTACHMENT FOR AUTOMOBILES.

Application filed June 4, 1925. Serial No. 34,927.

This invention relates to improvements in screen attachments for automobiles, including passenger automobiles, busses, and the like, and has as its general object to provide screens which may be readily installed in the windows of such vehicles or, in some instances, in the windshield frame, for the purpose of excluding insects, falling leaves, and any other objects which might cause annoyance to the occupants of such a vehicle.

In one embodiment of the invention, the invention contemplates the provision of a screen structure which may be installed and removed by the use of an ordinary screw driver and the invention further contemplates the provision of means for securing the screen frame within the window opening, which means may be replaced after the screen has been removed, so that the temporary removal of the screen will not leave the window frame of the vehicle in an unsightly condition.

Another object of the invention is to provide novel means for binding the edges of the screen sheet, which means will be simple in construction, inexpensive to manufacture, and exceptionally durable, and will so engage and hold the edges of the screen sheet as to at all times maintain the screen sheet in suitably stretched condition.

In the accompanying drawings:

Figure 1 is a view in elevation of one form of screen embodying the invention, parts being broken away to better illustrate the construction.

Figure 2 is a detail vertical sectional view through the screen structure taken substantially on the line 2—2 of Figure 1, looking in the direction indicated by the arrows.

Figure 3 is a horizontal sectional view in detail, taken substantially on the line 3—3 of Figure 1, looking in the direction indicated by the arrows.

Figure 4 is a view similar to Figure 1, illustrating a modified form of the invention.

Figure 5 is a detail vertical sectional view taken substantially on the line 5—5 of Figure 4, looking in the direction indicated by the arrows.

Figure 6 is a horizontal sectional view in detail, on the line 6—6 of Figure 4, looking in the direction indicated by the arrows.

Figure 7 is a similar view on the line 7—7 of Figure 4.

Figure 8 is a vertical sectional view in detail, on the line 8—8 of Figure 4, looking in the direction indicated by the arrows.

Figure 9 is a perspective view of a portion of the interior of a closed motor vehicle, illustrating one form of screen to be employed in the window opening of the fore door and likewise illustrating the embodiment of the principles of the invention in a screen structure for installation in the wind shield opening of the vehicle.

Figure 10 is a detail vertical sectional view taken substantially on the line 10—10 of Figure 9, looking in the direction indicated by the arrows.

Figure 11 is a vertical sectional view in detail, partly broken away, on the line 11—11 of Figure 9, looking in the direction indicated by the arrows.

Figure 12 is a view similar to Figure 9, illustrating a modified construction of the screen for use in connection with a wind shield including a tiltable wind shield section.

Referring to the form of the invention shown in Figures 1, 2 and 3 of the drawings, the numeral 1 indicates in general, the door of a closed automobile, which door is provided with the usual window opening 2 in which is slidably mounted the window pane 3. The screen which is applied to the inner side of the door about the window opening 2, includes a screen sheet 4 of wire mesh which is bound at its four margins by binding strips indicated in general by the numeral 5. Each of these binding strips 5 comprises a strip of sheet metal folded longitudinally at opposite sides of its longitudinal median line, as at 6, to provide spaced side portions 7, one of which portions is turned back upon itself as at 8, to provide a fold 9 lying flat against its inner side. The other portion 7 is bent back upon itself to provide a portion 10 between which and said portion 7, the margin of the screen sheet 4 is engaged, a portion of the margin of the sheet extending over the edge of the folded over portion 10 and another portion of the said margin being confined, through the compression of the binding strip, between the portion 10 and the portion 9. The four binding strips 5 constitute, in effect, a rectangular frame in which the screen 4 is stretched, although the ends of the binding strips do not mutually overlap in order that a finishing or cover strip may be associated with the binding strips. Openings 10a are formed at intervals in the length of the binding strips and through the portions 7, 9 and 10 thereof for the passage of securing screws 12 which are threaded into the wooden frame structure of the door which defines the window opening 2.

In connection with each of the binding strips 5, there is provided a covering member indicated in general by the numeral 13, and this member comprises a strip of sheet metal bent to substantially U-shape in cross section and, therefore, comprising spaced parallel side portions 14 and a connecting front portion 15. The covering members is so proportioned that it is adapted to be disposed over the respective binding strip 5 and, when properly positioned, will snugly fit over and enclose the said binding strip and conceal the same from view, the front 15 of each of the covering members having openings 16 therein for the passage of the securing screws 12. By reference to Figures 2 and 3 of the drawings, it will be observed that when the covering members are fitted over the respective binding strips the side portions 14 will engage one against the face of the frame structure of the door and the other against the portion of the screen sheet 4 which extends over the edge or fold 8 of the respective binding strip. In this manner, the binding strips are securely held in place against the frame structure of the door and the screen sheet is held properly stretched. The ends of relatively adjacent ones of the covering members 13 preferably meet and abut in the manner illustrated at the upper right hand corner of Figure 1 of the drawings, and in order to impart a finished appearance to the structure, corner pieces, indicated in general by the numeral 17, are provided and each includes right angularly extending portions 18 which are of channel formation and proportioned to fit over the end portions of the relatively adjacent covering members 13, being secured in place by certain of the screws 12 which are suitably located to serve this purpose.

From the foregoing description of this embodiment of the invention, it will be evident that the screen sheet 4, together with its binding strips 5, may be readily arranged to cover the window opening 2 and secured in place, and when it is not desired to use the screen, this portion of the structure may be completely removed, by first removing the corner members 17 and covering members 13, after which the said members 13 and 17 may be replaced. In practice, the members 13 and 17 will be finished so as to harmonize with the finish of the door upon which they are mounted, so that, when the screen is removed, these parts of the structure will not present an unsightly appearance.

In the embodiment of the invention illustrated in Figures 4 to 8 inclusive, the screen structure is designed to be set into the window opening, and in these figures, the numeral 19 indicates either a door structure or a portion of the body structure of the vehicle, provided with a window opening indicated by the numeral 20. The structure is formed at the opposite sides of the opening with the usual vertically extending grooves 21, and a window pane 22 is slidably mounted at its opposite edges in these grooves, felt battens 23 being arranged in the grooves to cushion the pane, as is usual. The screen structure is indicated in general by the numeral 24 and the same comprises side frame members indicated, one by the numeral 25 and the other by the numeral 26, and top and bottom frame members 27 and 28 respectively, the screen sheet being indicated by the numeral 29.

The side member 25 and top member 27 of the frame of the screen structure embodying this from of the invention are similarly formed and each is made from a strip of sheet metal folded upon itself as at 30, to provide spaced portions 31 and 32 receiving the respective margins of the screen sheet 29. The strip is also formed, by bending, to provide a two-ply portion 33 which opposes the portion 31 and accommodates between it and the said portion 31, the marginal portion of the screen sheet, the screen sheet at its marginal portion being folded around the edge of the portion 31 and likewise passing around the bend 30. The frame members 25 and 27 are secured by screws 34 to the inner side of the window frame at one side of said frame and to the under side of the top of the window frame respectively, and in position parallel to and relatively close to the respective grooves 21. In the specific window structure illustrated in the figures representing this embodiment of the invention, a rack bar 35 is provided at one side of the window frame, namely at that side at which the side member 26 of the screen fame is located. when the screen structure is installed, and a portion 35a of this bar is set into the side of the window frame and defines one wall of the respective groove 21. In this construction of the invention, the side member 26 is of the same construction as the side member 25 and top member 27, being formed from a strip of sheet metal folded upon itself as at 36, to provide the spaced portions 37 between which the edge of the screen sheet is received, and further folded to provide a two-ply fold 38 between which and one of the portions 37, the marginal portion of the screen sheet is received after being passed around the edge of said portion 37. In this particular construction, however, the outer ply of the fold 38 is extended to form a flange 39 which projects in a manner to engage in the groove 21 between the wall of the groove and packing strips 23 therein, as clearly shown in Figure 6 of the drawings. At this point it will be evident that when the screen structure is to be arranged within the window opening, its side at which the member 26 is located, is disposed in place with the flange 39 fitting into the respective groove 21, as shown in the said Figure 6, and as above described, whereupon the structure is swung into position with the member 25 engaging against the inner face of the opposite side of the window opening and the member 27 engaging against the under side of the top of the window opening, the securing screws 34 being then fitted through openings in the members 25 and 27 and screwed into the respective side and top of the window frame structure.

The bottom member 28 of the screen frame is likewise formed from a strip of sheet metal and the same is folded upon itself as at 40, to provide spaced portions 41 engaging the lower edge of the screen sheet, the marginal portion of the sheet passing around the free edge of the inner portion 41, and the strip being further folded to provide a bottom portion 42 and an upstanding portion 43 spaced with relation to the said inner one of the portions 41. The screen sheet at its lower margin extends in front of the said inner one of the portions 41 and between the same and the upstanding portion 43, and a strip 44 of felt or other suitable cushioning and packing material is secured in place between the portion 43 and the said marginal portion of the screen sheet and projects over the upper edge portion 43 so as to bear frictionally against the face of the window pane 22 and thus prevent insects from entering the car by crawling between the screen frame structure and the window pane.

The numeral 45 indicates a lever which is employed in connection with the window pane and which coacts with the rack 35 and may be manipulated to raise and lower the pane and, upon engagement with the rack, serves to hold the pane in different positions of adjustment.

In Figures 9 and 11 of the drawings, there is illustrated a fore door having a window opening 47 therein in which there is arranged a vertically slidable window pane 48, the sill of the window opening being indicated by the numeral 49. The screen structure in this embodiment is indicated in general by the numeral 50 and the same includes side frame members 51 and a top frame member 52. The side and top members are of identical construction and hence a description of one will suffice for all. Each of the side frame members is formed from a strip of sheet metal folded upon itself as at 53, to provide portions 54 which grip the margin of the screen sheet which is indicated by the numeral 55, and the strip is further folded as at 56 and bent to provide a two-ply fold indicated by the numeral 57 and defining between it and one of the folds 54, the marginal portion of the screen sheet 55. The numeral 58 indicates covering strips of channel formation which corresponds substantially to the covering members 5 heretofore described and which are fitted over the binding strips comprising the side and top members of the screen frame and secured in place by screws 59.

The window pane 48 is movable upwardly and downwardly through a slot 60 formed in the window sill 49. A strip 61 is applied to the bottom edge of the screen sheet and consists of sheet metal folded as at 62 to provide spaced folds 63 between which the lower margin of the screen sheet is secured by compression of the strip, the strip being further bent outwardly, as at 64, to provide an upstanding portion or flange 65 which binds the lower marginal portion of the screen sheet and also a strip 66 of felt which projects above and over the upper edge of the portion 65 of the binding strip and frictionally contacts the inner face of the window pane 48.

Figure 10 of the drawings, in connection with Figure 9, illustrates a screen structure which is to be employed in connection with a wind shield of the type in which the wind shield glass is mounted for limited vertical sliding movement. In this type of automobile, the wind shield opening, which is indicated by the numeral 67, is ordinarily straight at its top and at its opposite sides, but the lower side of the opening is usually arcuate, as indicated by the numeral 68. The wind shield glass is indicated by the numeral 69 and the numeral 70 indicates in general the screen structure embodying the invention. The screen structure includes a frame having ends 71, a top member 72, and a bottom member 73. The ends 71 are formed of sheet metal and are folded upon themselves to provide spaced portions 74 between which the edge of the screen sheet 75 is retained, the metal strip from which each end member is formed being further folded as at 76, to provide a portion 77 having its margin folded back upon itself as at 78, a packing strip of felt 79 being secured by adhesive or otherwise to the outer side of the end members 71, and screws or other fastening devices 80 being secured through the end members and into the sides of the wind shield frame to secure the screen structure in place, the bottom member 73 of the frame being arcuate in form to conform to the arcuate lower side of the wind shield pane opening, and the top member 72 of the frame being likewise preferably arcuate and substantially concentric to the bottom member 73. The top member 72 is formed from a strip of sheet metal folded along parallel lines to provide a retrorse pocket 81 in which the upper margin of the screen sheet is securely held, and the upper portion of the sheet metal strip comprising this member of the frame is folded back to extend rearwardly above the retrorse channel or pocket 81, as at 82, the strip being further bent to provide a portion 83 extending upwardly from the inner edge of the portion 82, and a portion 84 extending forwardly from the upper edge of the portion 83, thus providing an arcuate channel in which is retained a packing or cushioning strip 85 of felt or other suitable material, this strip, as well as the strip 79, engaging the inner face of the pane 69. The bottom member 73 of the pane is likewise formed from sheet metal and bent to provide a retrorse channel 86 accommodating and retaining the lower margin of the screen sheet, as clearly shown in Figure 10. The metal strip from which the bottom member 73 is formed is likewise bent to provide a two-ply base portion 87 which, as previously stated, conforms to the curvature of the lower side 68 of the wind shield opening or frame, a packing strip 88 of felt or other suitable material being secured by adhesive or otherwise to the under side of the base portion 87 and, therefore interposed between the said portion and the said lower side of the wind shield frame.

It will be observed from the several figures of the drawings and from the foregoing description, that in all embodiments of the invention, the binding strips or members constituting the frame in which the screen sheet is mounted, are so formed as to provide retrorse channels accommodating the marginal portions of the screen sheet.

Figure 12 of the drawings, illustrates a screen structure similar to that shown in Figure 1, except that it is designed for installation in the wind shield opening of a closed car of that type in which the wind shield sections are provided with adjusting and guiding means which are indicated by the numerals 89 and 90, and in order to accommodate these means or devices, the screen sheet 91 is slotted as at 92 and a reinforcing piece 93 of cloth or other suitable material is secured to the sheet and is arranged to bind the walls of the slit formed in the sheet and to fit more or less closely about the devices 89 and 90 and prevent the passage of insects into the car.

As illustrated in Figure 4 of the drawings corner braces 20' may be provided within the corners of the screen frame shown in this figure and, in fact, in the corners of the screen frames of any of the other forms of the invention, where found necessary or desirable.

It will be understood that inasmuch as some cars are provided along the inner sides of the members of their window frames with strips, these strips may be removed, in installing the screen attachment of the present invention, and laid aside, and, when the screen attachment is removed, in the winter months, the strips may be replaced. On the other hand, if desired, the frame members of the screen attachment of the present invention may be secured directly over the strips usually found in closed cars at the window openings.

Having thus described the invention, what I claim is:

1. A screen comprising a screen sheet and a sheet metal binding strip at an edge thereof folded upon itself between its longitudinal edges and having one of the folded edge portions bent upon itself to provide juxtaposed plies, and having the other folded edge portion bent inwardly upon itself to confine a folded edge portion of the screen sheet which is further clamped between the folded edge portions of the binding strip, and a covering strip extending over the binding strip, and having its edge portions bent to embrace opposite edge portions of the binding strip, and having the folded edge portions of the covering strip adjacent the screen sheet deflecting the same over the folded edge of the juxtaposed plies of the binding strip.

2. A screen for a window opening having a window receiving groove, a member applied to a side of the window frame and having an edge portion bent to extend into and form a wall of the said groove, a screen sheet, and a binding strip at an edge thereof folded upon itself intermediate its longitudinal edges and having one of the folded edge portions bent upon itself to provide juxtaposed plies and having the edge portion of the outer ply extended to form a flange to enter the said window receiving-groove, and having the other folded edge portion bent inwardly upon itself to confine a folded edge portion of the screen sheet which is further clamped between the folded portions of the strip.

3. The combination with the window frame structure of an automobile in which the side members of the frame are provided with grooves, and packing strips arranged within the grooves and a glass pane slidable at its edges in the said grooves, of a screen comprising a screen sheet, and a frame surrounding and supporting the sheet and comprising binding strips extending along the margins of the sheet and formed from sheet metal and bent to provide retrorse channels receiving the said margins of the sheet, the said binding strip having a projecting flange engaging in the respective groove between one wall thereof and the packing strip in said groove.

In testimony whereof I affix my signature.

JOEL KIRK WHITE.